(12) United States Patent
Kobayashi (10) Patent No.: US 11,654,514 B2
(45) Date of Patent: May 23, 2023

(54) LASER WELDING SYSTEM

(71) Applicant: KOBAYASHI MANUFACTURE CO., LTD., Hakusan (JP)

(72) Inventor: Yasunori Kobayashi, Hakusan (JP)

(73) Assignee: KOBAYASHI MANUFACTURE CO., LTD, Hakusan (JP)

( * ) Notice: Subject to any disclaimer, the term of this patent is extended or adjusted under 35 U.S.C. 154(b) by 0 days.

(21) Appl. No.: 17/776,364

(22) PCT Filed: Nov. 15, 2019

(86) PCT No.: PCT/JP2019/044918
§ 371 (c)(1),
(2) Date: May 12, 2022

(87) PCT Pub. No.: WO2021/095247
PCT Pub. Date: May 20, 2021

(65) Prior Publication Data
US 2022/0395928 A1    Dec. 15, 2022

(51) Int. Cl.
*B23K 26/26*    (2014.01)
*B23K 26/042*   (2014.01)
*B23K 26/10*    (2006.01)
*B23K 26/12*    (2014.01)
*B23K 26/14*    (2014.01)

(52) U.S. Cl.
CPC ............ *B23K 26/26* (2013.01); *B23K 26/042* (2015.10); *B23K 26/10* (2013.01); *B23K 26/123* (2013.01); *B23K 26/1464* (2013.01); *B23K 26/1482* (2013.01)

(58) Field of Classification Search
CPC ...... B23K 26/26; B23K 26/042; B23K 26/10; B23K 26/123; B23K 26/1464; B23K 26/1482
USPC .......................................................... 219/74
See application file for complete search history.

(56) References Cited

U.S. PATENT DOCUMENTS

2019/0061052 A1\*    2/2019  Hsu ...................... B23K 26/042

FOREIGN PATENT DOCUMENTS

| CN | 206216132 U | 6/2017 |
|---|---|---|
| JP | H04-351273 A | 12/1992 |
| JP | H09-57480 A | 3/1997 |
| JP | H10-6062 A | 1/1998 |
| JP | 2002-79391 A | 3/2002 |

(Continued)

OTHER PUBLICATIONS

Dec. 24, 2019, International Search Report issued in International Patent Application No. PCT/JP2019/044918.

(Continued)

*Primary Examiner* — Dana Ross
*Assistant Examiner* — Joseph W Iskra
(74) *Attorney, Agent, or Firm* — Oliff PLC (57) ABSTRACT

A shift in position of a laser beam used for welding objects is corrected without need for intervention by a welder. An irradiator performs welding along a welding part of objects to be welded by relatively moving objects to be welded and a nozzle for emitting a laser beam. An arm apparatus movably holds the nozzle while applying a biasing force to the nozzle in a direction toward the welding part such that the nozzle comes into contact with objects to be welded to irradiate the welding part with the laser beam.

14 Claims, 6 Drawing Sheets

(56) References Cited

FOREIGN PATENT DOCUMENTS

| | | | |
|---|---|---|---|
| JP | 2004-42113 | A | 2/2004 |
| JP | 2009-184013 | A | 8/2009 |
| JP | 2015-217408 | A | 12/2015 |
| JP | 2015217408 | * | 12/2015 |
| JP | 2017-006953 | A | 1/2017 |
| JP | 2017006953 | * | 1/2017 |
| JP | 2017-060982 | A | 3/2017 |
| JP | 2019-84536 | A | 6/2019 |

OTHER PUBLICATIONS

Jun. 22, 2021 Office Action issued in Japanese Patent Application No. 2020-520166.
Sep. 14, 2022 Office Action issued in Chinese Patent Application No. 201980102157.6.

* cited by examiner

LASER WELDING SYSTEM

TECHNICAL FIELD

The present invention relates to a technique for welding objects by a laser beam.

BACKGROUND ART

Known in the art is a technique for welding objects by a laser beam. For example, Patent Literature 1 describes a laser welding apparatus for welding a lid body to a case body.

CITATION LIST

Patent Literature

Patent Literature 1; JP-2019-84536A

SUMMARY OF INVENTION

Technical Problem

As a result of manufacturing errors, fixing errors, and a temperature errors, errors in sizes of objects to be welded may occur. In particular, when a plurality of objects that are each of the same size are welded for manufacture, variations may occur between sizes of the objects. When such objects are welded by use of a laser beam in sequence, even if positioning of the laser beam is carried out relative to one object to be welded, the laser beam may shift upon replacing with a next object to be welded. To correct such a shift in positioning, there is conceived repositioning of the laser beam for each of the objects to be welded; however, such an approach is time consuming and imposes a burden on a welder.

An object of the present invention is to correct a shift in position of a laser beam used for welding objects without need for intervention by a welder.

Solution to Problem

In the present invention, there is provided a laser welding system including: a laser welding unit configured to perform welding along a welding part of an object to be welded by relatively moving the object to be welded and a nozzle for emitting a laser beam; and a holding unit configured to movably hold the nozzle while applying a biasing force to the nozzle in a direction toward the welding part such that the nozzle comes into contact with the object to be welded to irradiate the welding part with the laser beam.

The holding unit may rotatably hold a rear end portion of the laser welding unit, and a leading end portion of the laser welding unit may be connected to the holding unit via an elastic member.

A corner may be formed at a position corresponding to the welding part, and in a case where the welding part is welded from the inside of the corner, the nozzle may have a shape that fits inside the corner.

The laser welding unit may further eject shielding gas from the nozzle to the welding part, and the shape may be a tapered shape.

The laser welding system may further include, in a case where the object to be welded are a first plate-shaped member and a second plate-shaped member that are joined by a butt joint, a jig that is provided on the first plate-shaped member and forms the corner with at least one of the first plate-shaped member and the second plate-shaped member.

A corner is formed at a position corresponding to the welding part, and in a case where the welding part is welded from the outside of the corner, the nozzle may have a shape that fits outside the corner.

The laser welding system may further include; a recognizing unit configured to recognize a shape of the corner; a selecting unit configured to select a nozzle having a shape corresponding to the recognized shape from a plurality of nozzles whose shapes are different to each other; and an attaching unit configured to attach the selected nozzle to the laser welding unit.

Advantageous Effects of Invention

According to the present invention, it is possible to correct a shift in position of a laser beam used for welding objects without need for intervention by a welder.

DESCRIPTION OF EMBODIMENTS

Hereinafter, an embodiment according to the present invention will be described with reference to the drawings. Note that, in the drawings, in order to facilitate understanding of the invention, the sizes, shapes, and ratios of constituent elements may be different from those of actual ones. An X-axis direction, a Y-axis direction, and a Z-axis direction shown in the drawings are directions that are perpendicular to each other. A −X-axis direction, a −Y-axis direction, and a −Z-axis direction are respectively directions opposite to the X-axis direction, the Y-axis direction, and the Z-axis direction. The vertical direction may be the −Z-axis direction.

Figure 1:
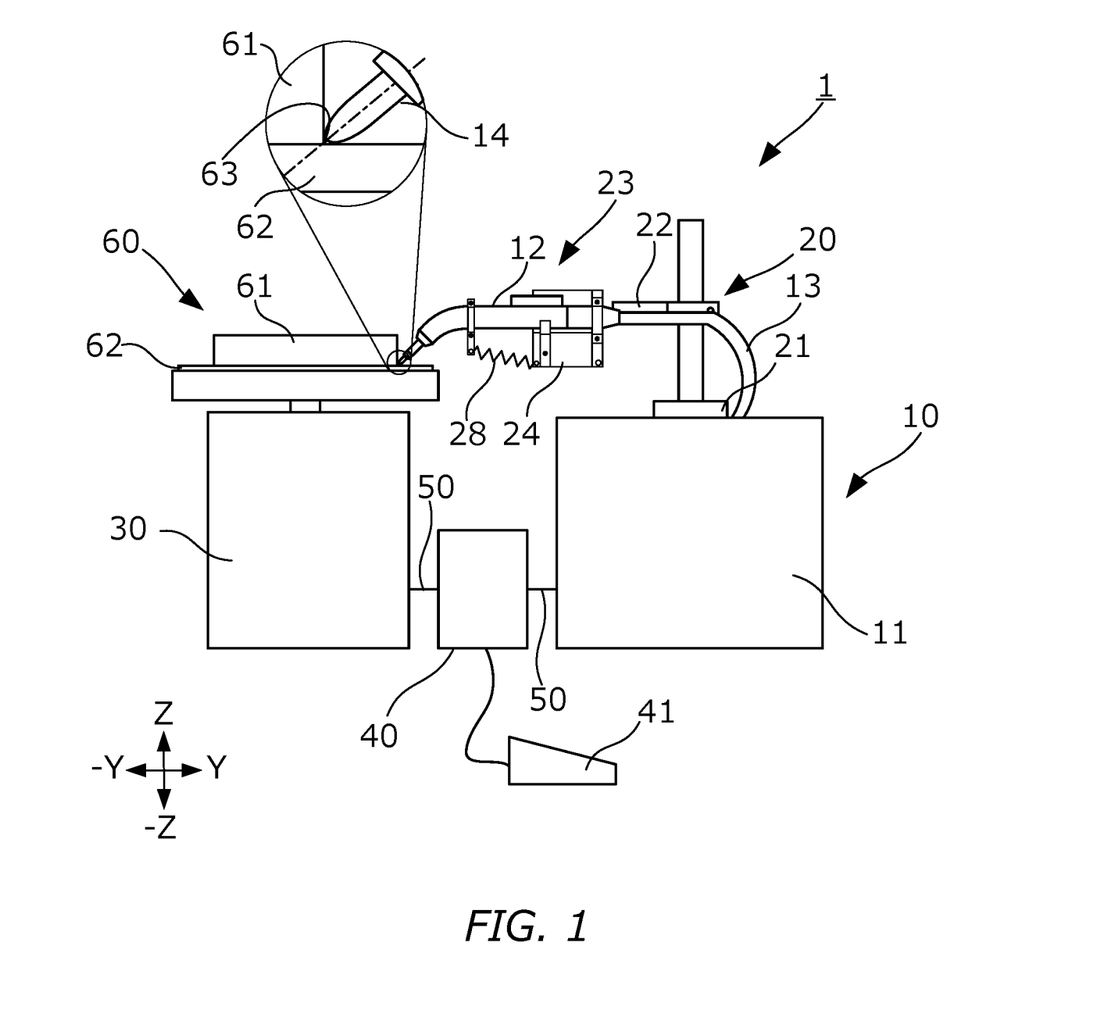
FIG. 1 is a diagram illustrating an example of the configuration of laser welding system 1 according to an embodiment.

FIG. 1 is a diagram illustrating an example of the configuration of laser welding system 1 according to an embodiment. Laser welding system 1 welds objects to be welded 60 by a laser beam. In laser welding system 1, welding progresses without an operator performing continuous operations. Laser welding system 1 includes laser welding machine 10, arm apparatus 20 (an example of a holding unit), turntable 30 (an example of a moving apparatus), and control apparatus 40.

Objects to be welded 60 are hollow tubular member 61 and disk-shaped flange 62, for example. Flange 62 is joined to one end of tubular member 61 so as to protrude in a radial direction. The outer peripheral face of tubular member 61 and the surface of flange 62 form an L-shaped cross-sectional face. The inside corner of L is junction 63 (an example of welding part) between tubular member 61 and flange 62. This junction 63 is formed by fillet welding along the circumference direction of tubular member 61.

Laser welding machine 10 welds objects to be welded 60 by a laser beam. Laser welding machine 10 includes oscillator 11 and irradiator 12 (an example of a laser welding unit). Oscillator 11 and irradiator 12 are connected through cable 13. Oscillator 11 generates a laser beam. The laser beam generated by oscillator 11 is supplied to irradiator 12 through cable 13. Irradiator 12 irradiates junction 63 with the laser beam for welding. Here, the laser beam is condensed and emitted by an optical system. Nozzle 14 is attached to a leading end of irradiator 12. The laser beam is emitted to junction 63 from nozzle 14. Also, irradiator 12 ejects shielding gas from nozzle 14 to junction 63 in order to prevent oxidization of junction 63. Argon, helium, or nitrogen may be used as the shielding gas, for example.

As shown in FIG. 1, nozzle 14 is shaped to be fitted in the corner formed at junction 63 of objects to be welded 60. Here, "shaped to be fitted in" means a shape with which at least a portion of nozzle 14 comes into contact with the corner and nozzle 14 stops. The shape of nozzle 14 and the shape of the corner need only partially match and need not completely match. When junction 63 of objects to be welded 60 is formed by welding from the inside of the corner, nozzle 14 is shaped to be fitted in the inside of the corner. Also, in order to sufficiently supply the shielding gas to junction 63, nozzle 14 preferably has a tapered shape. For example, the nozzle 14 may have a shape obtained by obliquely cutting a hollow tube relative to the bottom face.

Arm apparatus 20 holds irradiator 12 such that nozzle 14 can move to a position at which nozzle 14 is fitted in the corner of junction 63, using an elastic force of coil spring 28 (an example of an elastic member). Arm apparatus 20 includes fixing unit 21, arm 22, and holder 23. Fixing unit 21 is fixed to oscillator 11. A clamp may be used as fixing unit 21, for example. Arm 22 is for changing the position and angle of holder 23. One end of arm 22 is connected to fixing unit 21. The other end of arm 22 is connected to holder 23. Arm 22 includes a plurality of joints that can rotate or move. The position or angle of holder 23 is changed by rotating or moving the joints of arm 22. When the joints of arm 22 are fixed, the position or angle of holder 23 is maintained.

Figure 2:
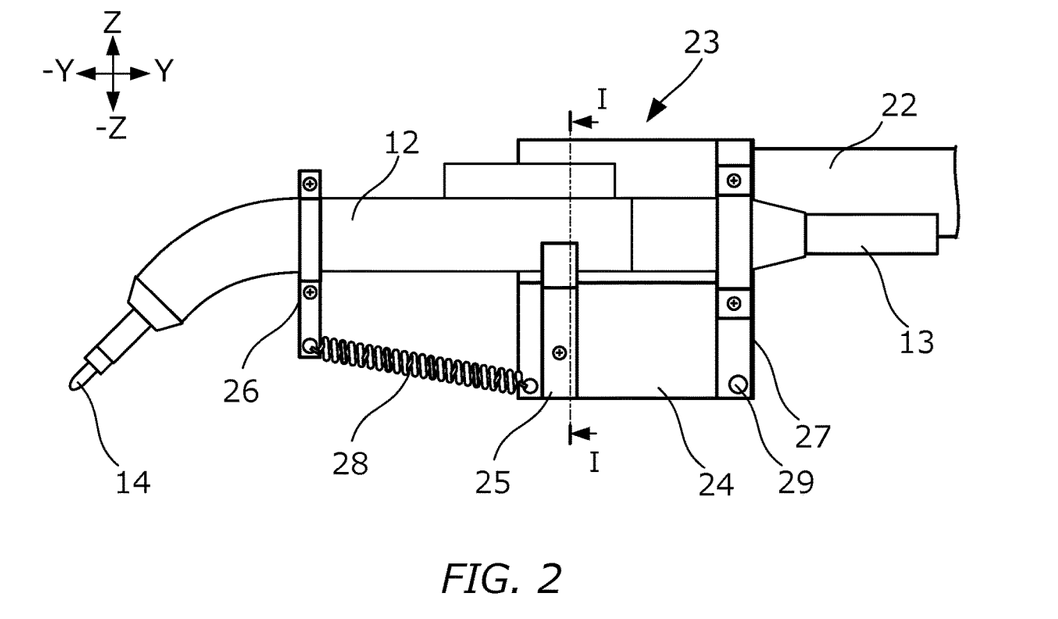
FIG. 2 is an enlarged view of irradiator 12 and arm apparatus 20.
Figure 3:
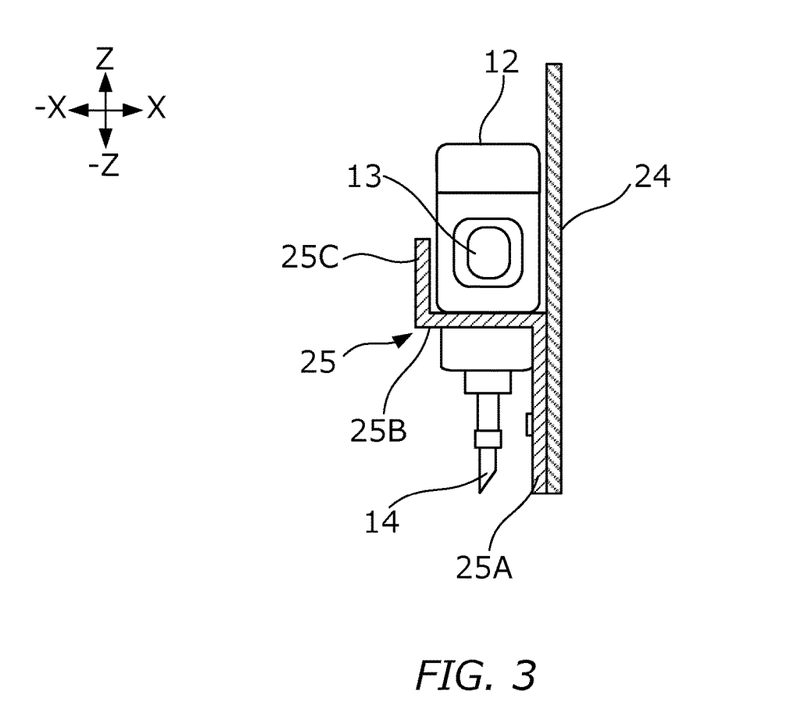
FIG. 3 is an I-I cross-sectional view of arm apparatus 20 shown in FIG. 2 viewed in the direction indicated by the arrow in FIG. 2.

FIG. 2 is an enlarged view of irradiator 12 and arm apparatus 20. FIG. 3 is an I-I cross-sectional view of arm apparatus 20 shown in FIG. 2 viewed in the direction indicated by the arrow in FIG. 2. Holder 23 supports irradiator 12, at a central portion thereof, so as to be movable in the Z-axis direction from the −Z-axis direction. Holder 23 includes plate-shaped base portion 24 and support member 25. Base portion 24 extends in the −Z-axis direction viewed from irradiator 12. As shown in FIG. 3, support member 25 includes first portion 25A, second portion 25B, and third portion 25C. First portion 25A extends in the X-axis direction. Second portion 25B extends in the −X-axis direction. Third portion 25C extends in the Z-axis direction. The end of first portion 25A in the Z-axis direction substantially perpendicularly meets the end of second portion 25B in the X-axis direction. The end of second portion 25B in the −X-axis direction substantially perpendicularly meets the end of third portion 25C in the −Z-axis direction. First portion 25A is fixed to an end portion of base portion 24 in the −Z-axis direction. Second portion 25B and third portion 25C forms an L shape. A space for housing the central portion of irradiator 12 is formed between base portion 24, second portion 25B, and third portion 25C. This space is open in the Z-axis direction.

Also, holder 23 rotatably supports a rear end portion of irradiator 12. As shown in FIG. 2, in irradiator 12, fixing member 27 that protrudes in the −Z-axis direction is fixed at a position between the position supported by support member 25 and a rear end. The protruding portion of fixing member 27 is rotatably attached to an end portion of base portion 24 in the −Z-axis direction by supporting point member 29. That is, base portion 24 rotatably holds fixing member 27 by supporting point member 29. A supporting point stepped screw may be used as supporting point member 29, for example.

Furthermore, holder 23 and a leading end portion of irradiator 12 are connected via coil spring 28. In irradiator 12, fixing member 26 protruding in the −Z-axis direction is fixed at a position between the position supported by support member 25 and the leading end. The protruding portion of fixing member 26 and base portion 24 is connected by coil spring 28. A biasing force acting toward junction 63 is applied to nozzle 14 by this coil spring 28.

Returning to FIG. 1, turntable 30 is for rotating objects to be welded 60 placed thereon. For example, when the welding direction is counterclockwise, turntable 30 rotates objects to be welded 60 in a clockwise direction.

Control apparatus 40 controls operations of laser welding machine 10 and turntable 30. Control apparatus 40 is connected to laser welding machine 10 and turntable 30 through communication lines 50. Foot pedal 41 is connected to control apparatus 40. Foot pedal 41 is used to perform an operation to control the operations of laser welding machine 10 and turntable 30. For example, when a worker steps on foot pedal 41, control apparatus 40 causes turntable 30 to rotate, and causes irradiator 12 to emit laser beams. When the worker leaves the foot from foot pedal 41, control apparatus 40 stops rotation of turntable 30, and stops emission of laser beams. Starting or stopping emission of laser beams may be respectively performed in synchronization with starting or stopping of rotation of turntable 30. These control may be realized by transmitting control signals, for example.

Figure 4:
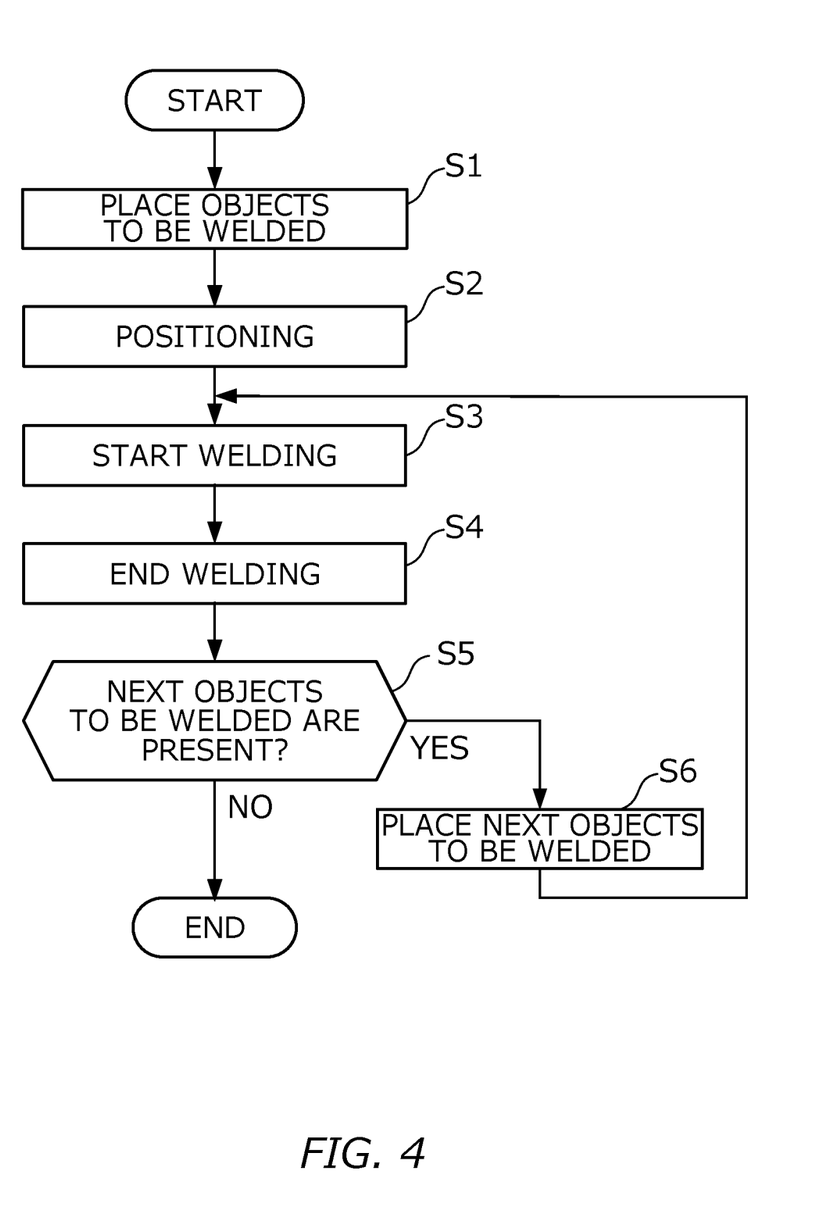
FIG. 4 is a flowchart illustrating an example of operations of laser welding system 1.

FIG. 4 is a flowchart illustrating an example of operations of laser welding system 1. Here, an example in which objects to be welded 60A to 60C that are manufactured in the same size are successively welded will be described. In step S1, a worker places objects to be welded 60A on turntable 30. In step S2, the positioning of the laser beam with respect to objects to be welded 60A is performed. The positioning is performed using a known method such as a method of using a laser beam that is weaker than a normal laser beam, or a method of using a camera, for example. Upon completing the positioning of the laser beam, the worker changes the position and angle of irradiator 12 by moving arm 22 of arm apparatus 20, for example, such that the laser beam is incident on junction 63, and thereafter arm 22 is fixed. Accordingly, irradiator 12 is held at a position from which the laser beam is incident on junction 63. Also, the position at which irradiator 12 is held is a position at which nozzle 14 comes into contact with junction 63A of objects to be welded 60A, and a position at which a biasing force toward junction 63A is applied to nozzle 14. In step S3, when the worker steps on foot pedal 41, turntable 30 rotates, and the laser beam is emitted from irradiator 12. Accordingly, junction 63 of objects to be welded 60A is irradiated with the laser beam along a welding direction, and welding of junction 63 is started. In step S4, when turntable 30 has rotated once, the entire junction 63A of objects to be welded 60A in the circumferential direction has been irradiated with the laser beam along the welding direction, and the welding is ended. Upon ending the welding, the worker removes their foot from foot pedal 41. Accordingly, turntable 30 is stopped and emission of the laser beam is also stopped. If next objects to be welded 60B are present (determination in step S5 is YES), in step S6, the worker places next objects to be welded 60B on turntable 30.

Figure 5:
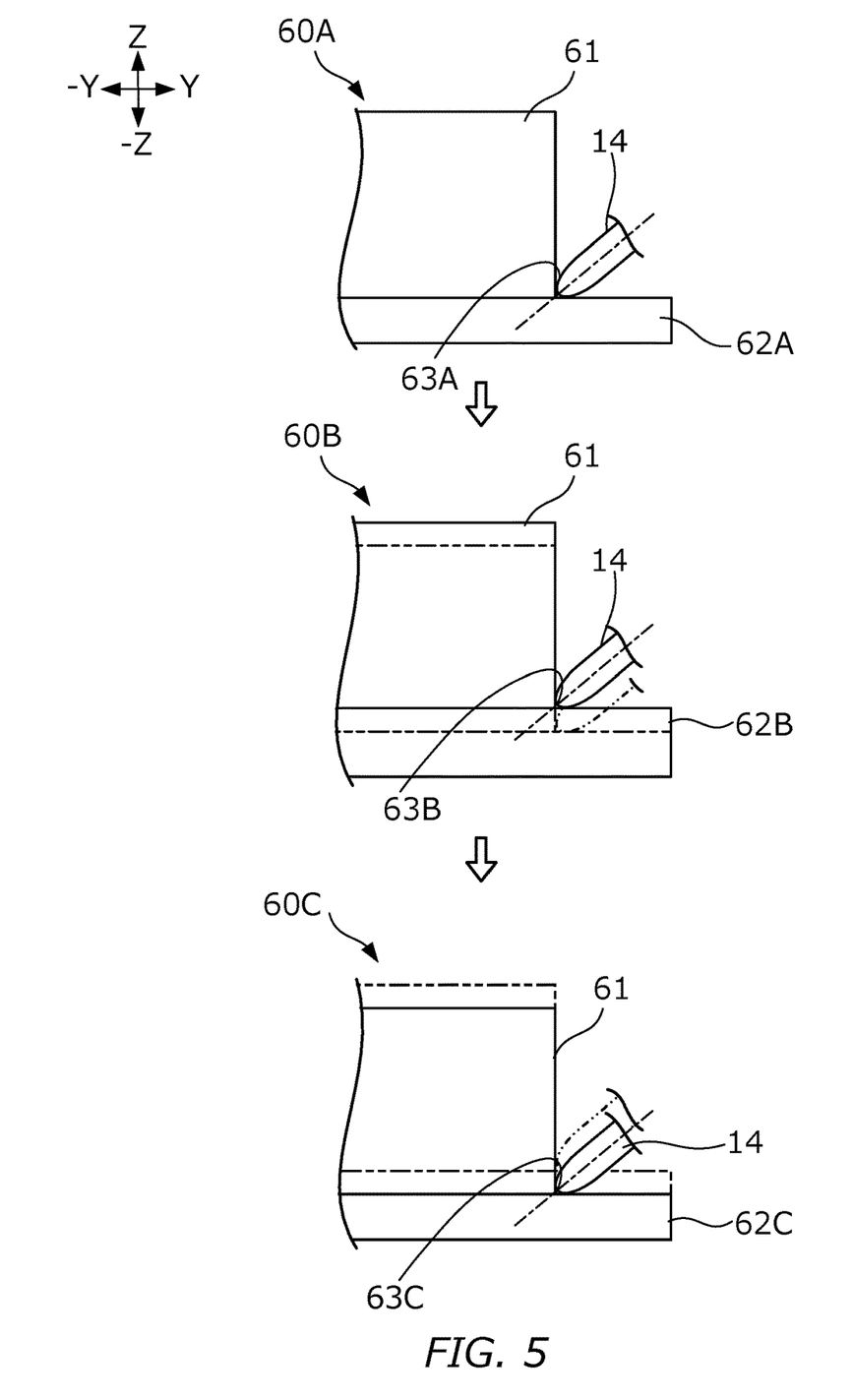
FIG. 5 is a diagram illustrating an example of operations of arm apparatus 20.
Figure 6:
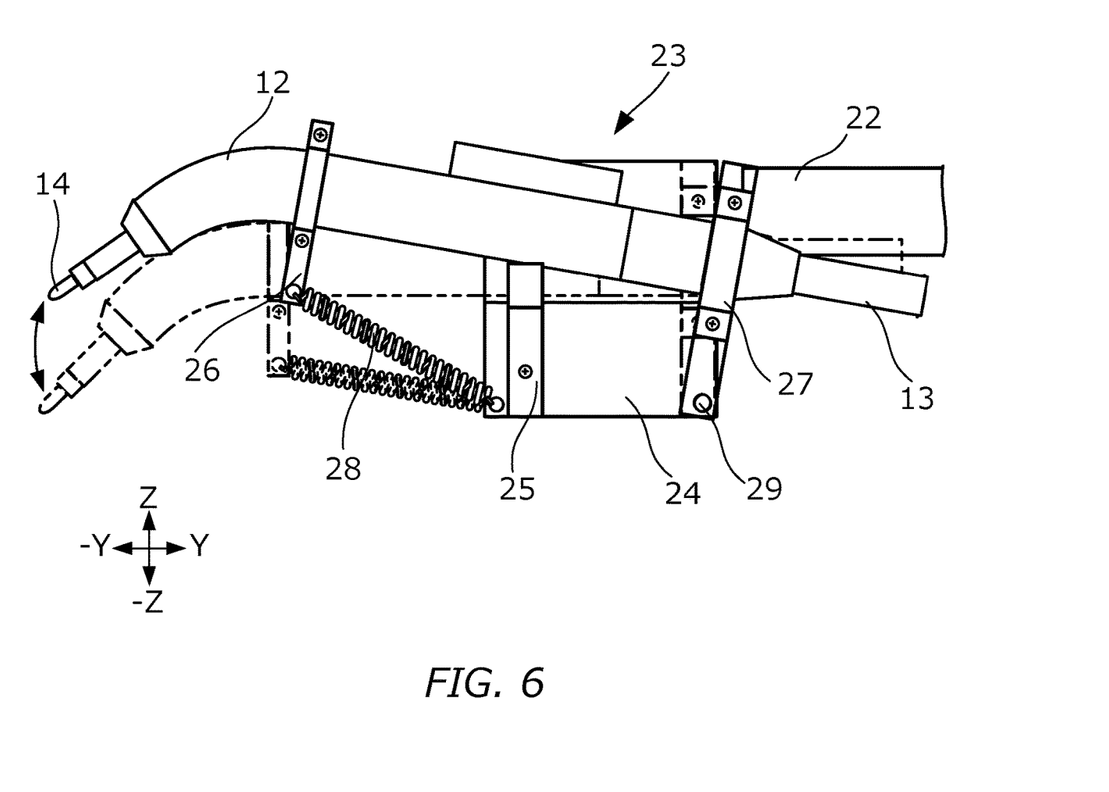
FIG. 6 is a diagram illustrating an example of operations of arm apparatus 20.

FIGS. 5 and 6 are diagrams illustrating an example of operations of arm apparatus 20. As described above, there are cases where, although objects to be welded 60A and objects to be welded 60B are manufactured in the same size, an error occurs in the size due to causes such as a manufacturing error. In particular, because the laser beam is narrow, if there is an error in size between objects to be welded 60A and objects to be welded 60B, the position on which the laser beam is incident is shifted from junction 63. If welding is performed without correcting the positional shift of the laser beam, junction 63 may not be sufficiently welded. In order to prevent such a welding failure, nozzle 14 of irradiator 12 moves according to the error between objects to be welded 60A and objects to be welded 60B.

In the example shown in FIG. 5, the length in the Z-axis direction of flange 62B of objects to be welded 60B is larger than that of flange 62A of objects to be welded 60A. In this case, when objects to be welded 60A are replaced with objects to be welded 60B, nozzle 14 of irradiator 12 is brought upward in the Z-axis direction by the surface of flange 62B of objects to be welded 60B. Then, coil spring 28 extends and irradiator 12 rotates in the clockwise direction about supporting point member 29, as shown in FIG. 6. Accordingly, nozzle 14 of irradiator 12 moves in the Z-axis direction. Also, as described above, nozzle 14 of irradiator 12 is shaped so as to be fitted inside the corner formed at junction 63 of objects to be welded 60. Therefore, when objects to be welded 60A are replaced with objects to be welded 60B, nozzle 14 of irradiator 12 stops at a position at which nozzle 14 is fitted inside the corner of junction 63B, as shown in FIG. 5. The position at which nozzle 14 is fitted inside the corner of junction 63B is preset to the position at which the center of the laser beam is incident on junction 63.

Returning to FIG. 4, after step S6, the above-described operations in step S3 and onward are performed. Here, the above-described positioning of laser beam in step S2 may not be performed. After welding of objects to be welded 60B is ended in this way, if next objects to be welded 60C are present (determination in step S5 is YES), in step S6, the worker places next objects to be welded 60C on turntable 30.

In the example shown in FIG. 5, the length in the Z-axis direction of flange 62C of objects to be welded 60C is smaller than that of flange 62B of objects to be welded 60B. In this case, when objects to be welded 60B are replaced with objects to be welded 60C, the force to bring nozzle 14 of irradiator 12 upward in the Z-axis direction is lost. Then, as shown in FIG. 6, coil spring 28 contracts, and irradiator 12 rotates in the counterclockwise directions about supporting point member 29. Accordingly, nozzle 14 of irradiator 12 moves in the −Z-axis direction. Also, as described above, nozzle 14 of irradiator 12 is shaped so as to be fitted inside the corner formed at junction 63 of objects to be welded 60. Therefore, when objects to be welded 60B are replaced with objects to be welded 60C, nozzle 14 of irradiator 12 stops at a position at which nozzle 14 is fitted inside the corner of junction 63C, as shown in FIG. 5. The position at which nozzle 14 is fitted inside the corner of junction 63C is preset to the position at which the center of the laser beam is incident on junction 63.

Also, when an error is present in the size of objects to be welded 60, there are cases where the position of junction 63 shifts in the Z-axis direction or in the −Z-axis direction. For example, when there is an error in the length of flange 62 in the Z-axis direction, and the surface of flange 62 is not flat, the position of junction 63 shifts in the Z-axis direction or in the −Z-axis direction. In such a case as well, similarly to the case where objects to be welded 60 are replaced, nozzle 14 of irradiator 12 moves according to the error in size in objects to be welded 60, and therefore the shift in position of the laser beam can be prevented in a period from when welding of objects to be welded 60 is started until the welding is ended.

According to the embodiment described above, even if an error in size is present in a plurality of objects to be welded 60 that are manufactured in the same size, when objects to be welded 60 are replaced, nozzle 14 of irradiator 12 moves to the position at which nozzle 14 is fitted inside the corner of junction 63 of objects to be welded 60. Therefore, the shift in position of the laser beam relative to the junction 63 can be corrected without worker intervention. Also, positioning of the laser beam need not be performed with respect to individual objects to be welded 60, and therefore the time and effort required of a worker are reduced, and the time it takes for the work is reduced. Also, a complex configuration is not needed, and therefore the shift in position of the laser beam relative to junction 63 can be corrected with a simple configuration. Furthermore, since nozzle 14 has a tapered shape, the shielding gas can be sufficiently supplied to junction 63, and the oxidization of junction 63 can be prevented.

The present invention is not limited to the embodiment described above. Also, the embodiment described above may be implemented while incorporating modifications described in the following examples. Here, two or more modifications described below may be used in combination.

Figure 7:
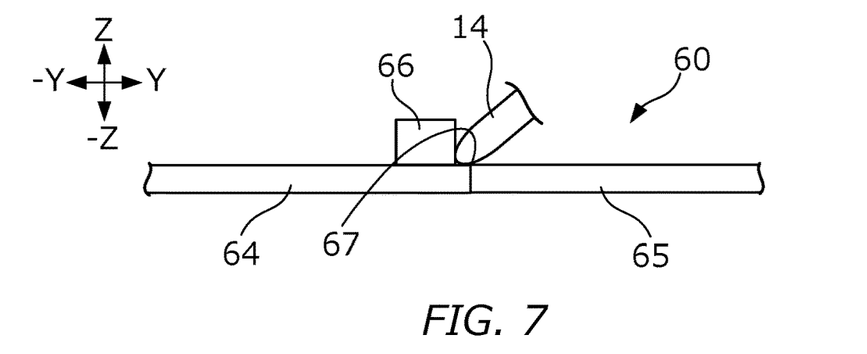
FIG. 7 is a side view illustrating an example of the configuration of objects to be welded 60 according to a modification.
Figure 8:
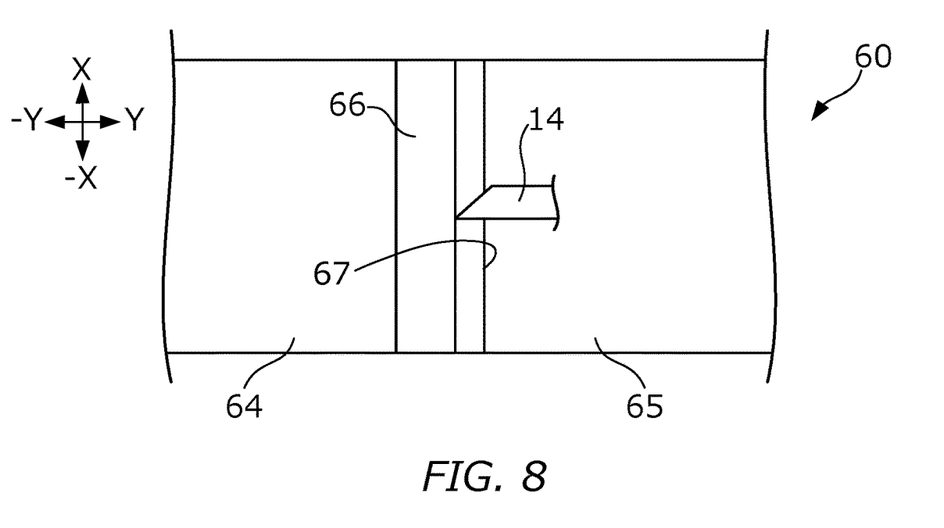
FIG. 8 is a plan view illustrating an example of the configuration of objects to be welded 60 according to the modification.

In the embodiment described above, objects to be welded 60 are not limited to tubular member 61 and flange 62 that are shown in FIG. 1. Objects to be welded 60 may be members having any shapes. For example, objects to be welded 60 may also be two plate-shaped members. Also, when these plate-shaped members are welded along a straight line, a moving apparatus that moves objects to be welded 60 along the straight line may be used in place of turntable 30. Furthermore, when first plate-shaped member 64 and second plate-shaped member 65 are joined by a butt joint, as shown in FIGS. 7 and 8, jig 66 may be provided on first plate-shaped member 64. Jig 66 has a predetermined height and extends in a welding direction, for example. The side face of jig 66 and the surfaces of first plate-shaped member 64 and second plate-shaped member 65 form an L-shaped cross-sectional face. This L-shaped corner is formed in the vicinity of junction 67 between first plate-shaped member 64 and second plate-shaped member 65. That is, this corner is formed at a position corresponding to junction 67. The position at which nozzle 14 is fitted inside the corner corresponding to junction 67 is preset to the position at which the center of the laser beam is incident on junction 67. According to this configuration, even in a case where first plate-shaped member 64 and second plate-shaped member 65 are joined by a butt joint, the shift in position of the laser beam can be corrected without worker intervention.

Figure 9:
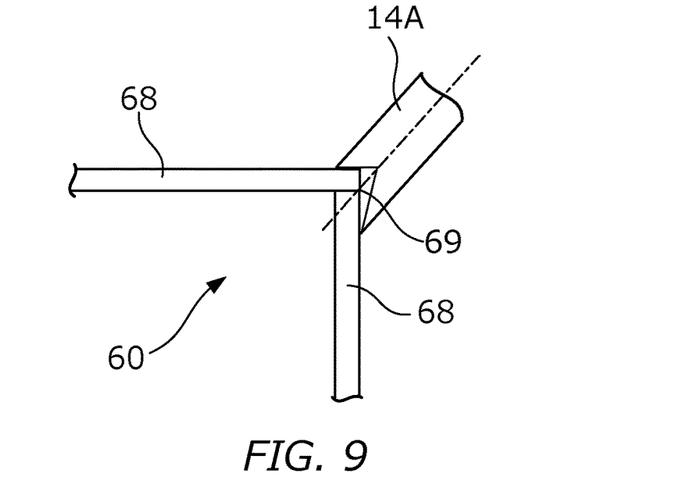
FIG. 9 is a diagram illustrating an example of the shape of nozzle 14A according to the modification.

In the embodiment described above, the shape of nozzle 14 is not limited to the example described in the embodiment. The shape of nozzle 14 may be any shape as long as nozzle 14 can be fitted in the corner formed in junction 63 of objects to be welded 60. For example, the shape of nozzle 14 may be a pointed shape, or may also be a round point shape. Also, when junction 63 is welded from the outside of the corner, the shape of nozzle 14 may be a shape such that nozzle 14 is fitted outside this corner. As shown in FIG. 9, for example, when objects to be welded 60 are two plate-shaped members 68 that are joined by corner assembly, and fillet welding is performed from the outside of the corner formed at a position in the vicinity of junction 69, that is, a position corresponding to junction 69, the shape of nozzle 14A may be a shape having a cutout whose shape corresponds to the corner. The position at which nozzle 14 is fitted outside the corner corresponding to junction 69 is preset to the position at which the center of the laser beam is incident on junction 69.

In the embodiment described above, objects to be welded 60 may be moved, arm apparatus 20 may be moved, or objects to be welded 60 and arm apparatus 20 may both be moved. That is, objects to be welded 60 and nozzle 14 for emitting a laser beam need only be moved relatively. When objects to be welded 60 are moved, the moving apparatus moves objects to be welded 60 in a direction opposite to the welding direction. On the other hand, when arm apparatus 20 is moved, the moving apparatus moves arm apparatus 20 in the welding direction. In short, the configuration need only be such that welding is performed along the welding part of objects to be welded 60 by relatively moving objects to be welded 60 and nozzle 14 for emitting a laser beam.

In the embodiment described above, an apparatus or a person that moves arm apparatus 20 is not limited to a worker. A robot may move arm apparatus 20 in place of a worker. In this case, the robot includes a processor, a memory, and a driving unit. A program is stored in the memory. The robot changes the position and angle of nozzle 14 of irradiator 12 by the driving unit moving arm apparatus 20 such that junction 63 is irradiated with a laser beam, where these hardware constituent elements and software constituent elements function together.

In the embodiment described above, nozzle 14 may be replaced according to the shape of the corner formed in junction 63 of objects to be welded 60. In this case, a plurality of nozzles 14 whose shapes are different to each other are prepared in advance, and a worker may select nozzle 14 having a shape corresponding to the shape of the corner formed in junction 63 of objects to be welded 60 from these nozzles 14, and attach nozzle 14 that has been selected to irradiator 12. Also, a robot may perform this task in place of the worker. In this case, the robot includes a camera, a processor, a memory, and a driving unit. A program is stored in the memory. The robot may realize functional units such as a recognizing unit, a selecting unit, and an attaching unit by causing these hardware constituent elements and software constituent elements to function together. Specifically, the robot captures an image of junction 63 of objects to be welded 60 using the camera. The recognizing unit recognizes the shape of the corner formed in junction 63 from the captured image using an image recognition technique. The selecting unit selects nozzle 14 having a shape corresponding to the recognized shape. The attaching unit attaches nozzle 14 that has been selected to irradiator 12 by causing the driving unit to move arm apparatus 20. According to this configuration, nozzle 14 suitable for welding of objects to be welded 60 can be attached to irradiator 12 without worker intervention.

In the embodiment described above, a means for applying a biasing force to nozzle 14 is not limited to coil spring 28. A pressing means such as a spring other than coil spring 28, a rubber, and an actuator, an electromagnetic means, a means using a pneumatic pressure, or a means utilizing dead weight may also be used as the means.

In the embodiment described above, the moving direction of nozzle 14 is not limited to the Z-axis direction. The moving direction of nozzle 14 may also be the X-axis direction or the Y-axis direction. That is, arm apparatus 20 may hold irradiator 12 such that nozzle 14 can move in at least one direction among the X-axis direction, the Y-axis direction, and the Z-axis direction. Accordingly, even if an error in the size of objects to be welded 60 occurs in any of the X-axis direction, the Y-axis direction, and the Z-axis direction, nozzle 14 moves according to the error.

In the embodiment described above, the term "substantially" may mean that an error such as a manufacturing error or a dimensional tolerance is included.

The present invention may also be provided as a welding method of objects to be welded 60.

REFERENCE SIGNS LIST

1 Laser welding system
10 Laser welding machine
11 Oscillator
12 Irradiator
14 Nozzle
20 Arm apparatus
21 Fixing unit
22 Arm
23 Holder
24 Base portion
25 Support member
26 Fixing member
27 Fixing member
28 Coil spring
29 Supporting point member
30 Turntable
40 Control apparatus
41 Foot pedal
60 Objects to be welded

The invention claimed is:
1. A laser welding system comprising:
a laser welding unit configured to perform welding along a welding part of an object to be welded by relatively moving the object to be welded and a nozzle for emitting a laser beam;
a holding unit configured to movably hold the nozzle while applying a biasing force to the nozzle in a direction toward the welding part such that the nozzle comes into contact with the object to be welded to irradiate the welding part with the laser beam; and
a fixing member attached to the laser welding unit at a position between a leading end of the holding unit and a leading end of the laser welding unit, wherein:
the holding unit guides by the biasing force the nozzle to the welding part where two members included in the object to be welded are joined by welding, and
the fixing member is connected to the leading end of the holding unit via an elastic member.

2. A laser welding system comprising:
- a laser welding unit configured to perform welding along a welding part of an object to be welded by relatively moving the object to be welded and a nozzle for emitting a laser beam;
- a holding unit configured to movably hold the nozzle while applying a biasing force to the nozzle in a direction toward the welding part such that the nozzle is guided to the welding part where two members included in the object to be welded are joined by welding, and comes into contact with the object to be welded to irradiate the welding part with the laser beam; and
- a fixing member attached to the laser welding unit at a position between a leading end of the holding unit and a leading end of the laser welding unit, wherein:
  - the holding unit rotatably holds a rear end portion of the laser welding unit, and
  - the fixing member is connected to the leading end of the holding unit via an elastic member.

3. A laser welding system comprising:
- a laser welding unit configured to perform welding along a welding part of an object to be welded by relatively moving the object to be welded and a nozzle for emitting a laser beam;
- a holding unit configured to movably hold the nozzle while applying a biasing force to the nozzle in a direction toward the welding part such that the nozzle is guided to the welding part where two members included in the object to be welded are joined by welding, and comes into contact with the object to be welded to irradiate the welding part with the laser beam; and
- a fixing member attached to the laser welding unit at a position between a leading end of the holding unit and a leading end of the laser welding unit, wherein:
  - the holding unit movably holds the nozzle in a direction intersecting an irradiation direction of the laser beam, and
  - the fixing member is connected to the leading end of the holding unit via an elastic member.

4. The laser welding system according to claim 1,
wherein a corner is formed at a position corresponding to the welding part, and
in a case where the welding part is welded from the inside of the corner, the nozzle has a shape that fits inside the corner.

5. The laser welding system according to claim 4,
wherein the laser welding unit further ejects shielding gas from the nozzle to the welding part, and
the shape is a tapered shape.

6. The laser welding system according to claim 4, further comprising:
in a case where the object to be welded are a first plate-shaped member and a second plate-shaped member that are joined by a butt joint, a jig that is provided on the first plate-shaped member and forms the corner with at least one of the first plate-shaped member and the second plate-shaped member.

7. The laser welding system according to claim 1,
wherein a corner is formed at a position corresponding to the welding part, and
in a case where the welding part is welded from the outside of the corner, the nozzle has a shape that fits outside the corner.

8. The laser welding system according to claim 4, further comprising:
- a recognizing unit configured to recognize a shape of the corner;
- a selecting unit configured to select a nozzle having a shape corresponding to the recognized shape from a plurality of nozzles whose shapes are different to each other; and
- an attaching unit configured to attach the selected nozzle to the laser welding unit.

9. The laser welding system according to claim 1, wherein the holding unit includes:
- a base portion whose longitudinal direction in a cross section view extends in a first direction; and
- a support member with a first portion and a second portion, the first portion having a longitudinal direction in the cross section view that extends in the first direction and the second portion connecting the first portion and the base portion and having a longitudinal direction in the cross section view that extends in a second direction perpendicular to the first direction,
wherein the base portion, the first portion and the second portion form a space with an open end opposite the second portion that houses the laser welding unit.

10. The laser welding system according to claim 2, wherein the holding unit includes:
- a base portion whose longitudinal direction in a cross section view extends in a first direction; and
- a support member with a first portion and a second portion, the first portion having a longitudinal direction in the cross section view that extends in the first direction and the second portion connecting the first portion and the base portion and having a longitudinal direction in the cross section view that extends in a second direction perpendicular to the first direction,
wherein the base portion, the first portion and the second portion form a space with an open end opposite the second portion that houses the laser welding unit.

11. The laser welding system according to claim 3, wherein the holding unit includes:
- a base portion whose longitudinal direction in a cross section view extends in a first direction; and
- a support member with a first portion and a second portion, the first portion having a longitudinal direction in the cross section view that extends in the first direction and the second portion connecting the first portion and the base portion and having a longitudinal direction in the cross section view that extends in a second direction perpendicular to the first direction,
wherein the base portion, the first portion and the second portion form a space with an open end opposite the second portion that houses the laser welding unit.

12. The laser welding system according to claim 1, further comprising:
a turntable configured to support the object and configured to rotate the object when the laser welding unit performs welding along the welding part.

13. The laser welding system according to claim 2, further comprising:
a turntable configured to support the object and configured to rotate the object when the laser welding unit performs welding along the welding part.

14. The laser welding system according to claim 3, further comprising:
- a turntable configured to support the object and configured to rotate the object when the laser welding unit performs welding along the welding part.

\* \* \* \* \*